United States Patent

[11] 3,563,244

[72] Inventors Kunitami Asaka
  Tokyo;
  Masao Mori, Ichinomiya-shi, Japan
[21] Appl. No. 713,293
[22] Filed Mar. 15, 1968
[45] Patented Feb. 16, 1971
[73] Assignees Hajime Moribe
  Tokyo, Japan;
  Shintaro Ide
  Hyogo-ken, Japan

[54] CONDOMS
  10 Claims, No Drawings
[52] U.S. Cl. .................................................. 128/294
[51] Int. Cl. .................................................. A61f 5/42
[50] Field of Search ........................................... 128/287,
  294, 295, 132

[56] References Cited
UNITED STATES PATENTS

| | | | |
|---|---|---|---|
| 3,123,075 | 3/1964 | Stamberger | 128/287 |
| 3,136,417 | 6/1964 | Clinch | 128/294 |
| 3,363,624 | 1/1968 | Fishman | 128/294 |
| 3,443,563 | 5/1969 | Ishihama | 128/294X |

Primary Examiner—Charles F. Rosenbaum
Attorney—Sughrue, Rothwell, Mion, Zinn & MacPeak ABSTRACT: A condom, the film of which consists of a bland of a synthetic resinous substance such as saponified polyvinyl alcohol and a rubber latex, said condom being capable of keeping its physical configuration when brought into contact with warm aqueous liquid having a temperature substantially same as that of a human body, yet capable of being decomposed when kept into contact with cold water and after lapse of a certain time period.

CONDOMS

This invention relates to improvements in and relating to condoms.

Conventional condoms are almost exclusively manufacture from rubber or a similar watertight and water-insoluble substance. When these products after usage thereof are thrown into a domestic sanitary or sewage system, clogging thereof frequently occurs. Wasted rubber condoms frequently float on the water in city sewage systems and may be viewed at exposed places, because these conventional condoms possess a strong tendency to keep permanently their physical configuration even after contact with water.

It is therefore the main object of the present invention to provide a highly improved condom which is decomposable by contact with cold water within a short time period, yet durable in contact with warm aqueous liquid and without a considerable loss of the necessary watertightness, sensibility transmitting performance, right contacting nature and elasticity which must be possessed by the condom.

The term "cold" used herein throughout the specification means "normal temperature and that lower than the normal," while the term "warm" means that lying at least within the range of those which are kept normally by living human bodies. Said range may be considered to be 35—39° C., while the normal temperature may be deemed to be at the highest 25° C.

The invention resides in its broadest aspect in a condom comprising a mixture of a synthetic resinous substance and a rubber substance, said mixture being capable of maintaining a continuous film shape even in contact with an aqueous liquid so far as the latter is kept at a temperature of that of the living human body, or higher, yet capable of collapsing its film shape upon contact with cold water, with a rubber material.

In a preferred embodiment of the invention, the novel condom referred to above may be coated with a very thin film of rubber substance, in order to increase the elasticity of the original condom.

The reason why a blend of synthetic resinous substance with rubber material is used is based upon the fact that rubber has practically no tendency to collapse its formed shape, even upon contact with an aqueous liquid, although the shaped rubber material has a satisfying degree of elasticity, and that certain film-forming synthetic resins, excepting synthetic rubber and the like, possess generally a strong tendency to collapse their physical configuration, or given film shape, upon contact with water, even though they may be insoluble in the latter. Applicants have found that a mixture of both kinds of materials has both a strong tendency toward the aforementioned collapsing or decomposing in water, together with the necessary thermal sensitivity for the aforementioned desired purpose.

More specifically, it has been found that if a condom is prepared from such a mixture, it retains the physical configuration and elasticity of the condom, even when it is brought into contact with an aqueous liquid kept at the temperature of a living human body or even higher than that, the temperature range being at least 35—39° C., yet capable of collapsing its film shape upon contact with cold water kept generally at 25° C. or still lower.

Although the temperature difference to which the condom material must show its thermal sensitivity thus amounts to only a limited value on the order of about 10 to 14° C., it was now surprisingly found that certain of the above blended materials are capable of satisfying the aforementioned properties in contact with aqueous liquid during and after use of the condom.

As the synthetic resin material to be used in the present invention, polyvinyl alcohol having a certain range of saponification value, preferably about 60—80 mol. percent, and a certain degree of polymerization, preferably about 500—2,000, may be employed.

A saponified copolymer of vinyl ester, preferably vinyl acetate, with a small amount of an acid or other copolymerizable therewith, such as acrylic acid, acrylic amide, vinyl chloride, crotonic acid, maleic acid, anhydrous maleic acid may equally be employed. The saponification value and polymerization degree may be as before.

Various derivatives of polyvinyl alcohol resin such as partially acetalized products and urethanized products of the aforementioned substances may be also used. Suitable acetalized material may be, among others, formalized-, acetoacetalized-, propionalized-, butyralized-, methoxybutyralized-, ethoxybutyralized-, benzalized or the like (i.e., the product of any of the said polyvinyl alcohol derivatives reacted with an aliphatic or aromatic aldehyde).

In place of or in combination with polyvinyl alcohol or its derivative, a resinous polyvinyl alkylether, such as polyvinyl methylether or its copolymer, may be used. In place of these materials, cellulose derivatives, such as methyl cellulose, ethyl cellulose, carboxymethyl-, carboxyethyl cellulose and the like may equally be used.

The aforementioned examples of usable material are naturally only representative.

The saponification value, polymerization degree, selection of copolymer component, degree of the acetalization, degree of urethanization and/or the like to be employed depend upon the kind and nature of the resinous material to be employed. These conditions, however, may be easily determined by simple and easy practical experiments, when a person skilled in the art is guided by the novel teaching of the present specification.

The another component used in the blended mixture, that is the rubber substance, may be a synthetic rubber, such as styrene-butadiene rubber, acryronitrile-butadiene rubber, butadiene rubber, chloroprene rubber, acrylate-butadiene rubber or the like.

The ratio of blending of said kind of synthetic resin material with the rubber substance may advantageously be from 8:2 to 5:5, preferably from 7:3 to 6:4.

Although the blending process imposes substantially no limitation, it is preferable to admix previously a small amount of water or water-miscible organic solvent to the resin component of the mixture and then a large amount of water is added to the intermediate mixture, so as to provide an evenly distributed dispersion or solution, as the case may be. As the rubber substance, rubber latex may preferably be used. These components are mixed together thoroughly by strong agitation, so as to provide a production liquor of high homogenity.

The process of manufacturing the condoms from the abovementioned production liquor may be conventional. The dipping process is highly recommended. Vulcanization may under most circumstances be carried into effect, but it is not absolutely necessary.

If desired, the condom prepared by the aforementioned process may further be lined with a very thin rubber film. This rubber lining may be attached onto the outer surface of the primary condom, or onto the inner surface thereof, or both, as the case may be. In this case, the film thickness of the primary condom made of the blended mixture may amount to 0.03-—0.06 mm., preferably 0.04—0.05 mm., and that of the rubber coating layer may amount to 0.001—0.01, preferably 0.003—0.006 mm.

As will be seen from the foregoing, the primary condom per se is ready for use. When this condom, after use thereof, is inserted into a pool of cold water, the synthetic resin component which is believed to act as a kind of binder for the rubber substance contained in the blended mixture or a kind of filler among cross linked particles, will absorb a certain amount of water, thereby being subjected to a swelling or partial dissolving and the insoluble rubber particles becoming loosened in their rigidly united structure, or are deprived of their binder particles existing in the cross linked structure, by virtue of the partial dissolving of the resin material into the water. Alternatively, the condom structure as a whole is subjected to a kind of severe modification in its chemical and physical structure by contact of the hydrophilic blend component with water. By any one or more of the aforementioned phenomena, the condom will be, as ascertained by our practical experiments, destroyed gradually in its physical configuration, accompanied by a general swelling of the condom, thus inviting the decomposition of the whole structure.

The decomposition period of the condom upon insertion into water depends upon the kind and amount of the resinous component employed. In addition, this period may be substantially shortened when the insertion is made into a water flushing sanitary system where the rejected waste product may be subjected to severe fluid and mechanical agitation. In the latter case, this period may extend only for several minutes. On the contrary, when the used condom is inserted into a static water pool, the period may extend for several hours or even several days.

Even when the condom lined with an additional thin layer of rubber in order to increase its elasticity is thrown into a water pool, this double-layer composite condom may be well decomposed by contact with water. This decomposing phenomenon was observed by us for the first time. This phenomenon may be deemed as the reverse if a person skilled in the art should think of the decomposing process, because it is the very common sense possessed by the skilled persons that a rubber film is highly insoluble in water. In fact, however, the hydrophilic resinous material absorbs water so strongly that the rubber particles are attracted by the swelling resin particles, thereby decomposing, sooner or later, the original tubular film configuration and finally splitting it into small particles. Therefore, in this case, also, the composite condom may be destroyed completely by contact with water. Such a decomposition technique for rubber film tubes is naturally the first such discovery in the art.

In the following, several preferred examples of the invention will now be given only for illustrating purposes. In these examples, parts and percentages are given by weight, if not otherwise noted.

Example 1

|  | Parts |
|---|---|
| Partially saponified polyvinyl alcohol (saponification value: 63.2 mol percent: polymerization degree: 500) | 65 |
| Natural rubber latex | [1] 35 |
| Plasticizer (glycerine) | 6.5 |
| Vulcanizing agent (colloidal sulfur) | 0.5 |
| Vulcanizing accelerator ("SOKCINOL-TP"; manufactured and sold by Sumitomo Chemical Co., Osaka, Japan, consisting of sodium thiocarbamate) | 0.5 |
| Vulcanizing additive (active zinc white) | 0.7 |

[1] Resinous content only.

These substances were added with a proper quantity of water and thoroughly mixed together to provide a 15 percent aqueous dispersion which was then charged into an open reservoir vessel so as to form a dipping bath.

Conventional condom forms, made of glass and preferably coated with a conventional separating agent, were dipped in the bath, taken out therefrom and then air-dried at 55° C. The dip coating and air-drying procedure was repeated three times. Finally, the coated forms were heated at 100° C. for 90 minutes, whereupon the coatings were removed from the forms. The film thickness was about 0.05 mm.

These condoms were then subjected to an elongation test at a tension of 68 kgs./cm.$^2$, showing an elongation of 570 percent. The elasticity was inferior to that of a conventional rubber latex film, but these products were ready for use.

Next, a liquid-tightness test was performed in such a way that each of the condoms was partially filled with colored water at a pressure of 1 meter of water column and was dipped in the bath, kept at 36° C. Then, the time when the colored water penetrated through the film and invaded into the bath water to a visually recognizable degree. Three of 100 condoms showed slight leakage in a shorter time period while the others were highly satisfactory. In industrial manufacture, such defective products are naturally rejected upon a preliminary test similar to that described above. None of the produced condoms showed cracks or liquid issuing from large holes.

One hundred condoms of the next batch were tested as to the collapsing or decomposing performance of the products by bringing them into contact with cold water. For this purpose, they were separately thrown into the live water piping of a domestic sanitary system and thus subjected to cold water flushing under gravity tank pressure. The flushed water was then visually inspected to observe the behavior of the rejected condoms. They were found to have none of their original configuration, but were split into small pieces and in a somewhat swollen state, having been completely destroyed. Therefore, when inspected upon lapse of several hours, it is believed that the condoms will have been completely decomposed into particles which are not visually observed by the naked eye.

Example 2

|  | Parts |
|---|---|
| Partially saponified polyvinyl alcohol (saponification value: 68.1 mol percent; degree of polymerization: 1410) | 70 |
| "SBR-Latex" (stylene-butadiene copolymer) | [1] 30 |
| Glycerine | 7 |
| Vulcanizing agent (p,p′-dibenzoyl quinone dioxime) | 1.0 |
| Vulcanizing accelerator (zinc salt of 2-mercaptobenzothiazole) | 0.7 |
| Vulcanizing additive (active white zinc) | 0.5 |

[1] Resinous component.

These agents were mixed together and processed substantially in the manner as set forth in the foregoing example, thereby producing a number of condoms having a film thickness of 0.04 mm. Similar tests for tensile strength, elongation, liquid tightness, defective openings and cold water dipping, were carried out as in the case of example 1.

The results were substantially same as before. However, the tensile strength amounted 53 kgs./cm.$^2$, while the degree of elongation amounted to 430 percent.

Example 3

|  | Parts |
|---|---|
| Partially saponified polyvinyl alcohol (saponification value: 75.7 mol percent; degree of polymerization: 860) | 60 |
| "NBR-Latex" (acrylonitrile, butadiene copolymer) | [1] 40 |
| Glycerine | 6 |
| Vulcanizing agent (same as in the foregoing Example 2) | 1.0 |
| Vulcanizing accelerator (same as in the foregoing Example 2) | 0.7 |
| Vulcanizing additive (same as in the foregoing Example 2) | 0.5 |

[1] Resinous content.

These substances were mixed together and treated substantially as in example 1, the results being substantially similar and the products being durable for use with desirous effects. The tensile strength amounted to 113 kgs./cm.$^2$, while the degree of elongation was in the order of 790 percent.

Example 4

|  | Parts |
|---|---|
| Actoacetalized polyvinyl alcohol (degree of acetalization: 43.0 mol percent; degree of polymerization: 1,430) | 65 |
| "SBR-Latex" | [1] 35 |
| Plasticizer (polyethylene glycol monobutyl ester) | 12 |
| Vulcanizing agent (colloidal sulfur) | 0.7 |
| Vulcanizing accelerator (dibutyl sodium dithiocarbamate) | 0.7 |
| Vulcanizing additive (active white zinc) | 0.5 |

[1] Resinous content.

These substances were mixed together and treated as in example 1 under similar vulcanizing conditions as mentioned therein, thereby providing finished condoms, having a film thickness of 0.04 mm.

The test results were substantially same as before.

The tensile strength amounted to 81 kgs./cm.$^2$, while the degree of elongation was on the order of 520 percent.

Example 5

|  | Parts |
|---|---|
| Acetoacetalized polyvinyl alcohol (degree of acetalization: 48.3 mol percent; degree of acetylization: 0.5 mol percent; degree of polymerization: 1,400) | 60 |
| "NBR-Latex" | [1]40 |
| Plasticizer (glycerine) | 5 |
| Plasticizer (DBP) | 5 |

[1] Resinous content.

These substances were mixed intimately and then processed similarly in the foregoing example 1 except that the vulcanization was omitted. In this way, condoms, each having a film thickness of 0.04 mm., were obtained. Tensile strength: 74 kgs./cm.$^2$; elongation: 670 percent.

Other features were substantially the same as in the foregoing example 4.

Example 6

|  | Parts |
|---|---|
| Formalized polyvinyl alcohol (acetalization degree: 28.3 mol percent; acetylization degree: 8.5 mol percent; degree of polymerization: 1,380 | 55 |
| Butadiene-latex | [1]45 |
| Plasticizer (glycerine) | 7 |
| Plasticizer (DEP) | 7 |
| Vulcanizing agent (colloida sulfur) | 0. 5 |
| Vulcanizing accelerator (Nokusera-TP", trade name, manufactured by vulcanizing by vulcanizing additive (active zinc white) | 1. 0 |

[1] Resinous content.

These substances are mixed together and treated in the manner of example 1. In this way, condoms, each having a film thickness of 0.04 mm., were obtained. Tensile strength: 123 kgs/cm.$^2$; elongation: 710 percent.

Other characteristics were similar to those in the foregoing example 4.

Example 7

|  | Parts |
|---|---|
| n-Butyralized polyvinyl alcohol (degree of acetalization: 7.3 mol percent; degree of acetylation: 6.3 mol percent; degree of polymerization: 1,400) | 75 |
| Natural rubber latex | 25 |
| Colloidal sulfur | 0. 25 |
| "Nokusera-TP" | 0. 25 |
| Plasticizer (glycerine) | 7 |
| Plasticizer (B.P.B.G., or butyl phthalyl butyl grycolate) | 7 |
| Active zinc flower | 0. 5 |

These substances were mixed together and processed as before. The results were substantially the same as before. Tensile strength: 42 kgs./cm.$^2$; elongation: 830 percent.

Example 8

|  | Parts |
|---|---|
| Modified polyvinyl alcohol (crotonic acid content: 3.0 mo. percent; vinyl alcoholic content: 27.3 mol percent; vinyl acetate content: 69.7 mol percent, degree of polymerization of the copolymer: 1,000) | 55 |
| S.B.R | 45 |
| Plasticizer (glycerine) | 7 |
| Colloidal sulfur | 0. 5 |
| "Nokusera-TP" | 0. 5 |
| Active zinc flower | 1. 0 |

These substances were mixed together and further processed as before. The results were similar as before. Tensile strength: 76 kgs./cm.$^2$; elongation: 1,020 percent.

Example 9

|  | Parts |
|---|---|
| Polyvinyl methylether (degree of polymerization: about 1,000) | 25 |
| Polyvinyl alcohol (saponification value: 72.5 mol percent; degree of polymerization) | 40 |
| S.B.T | 35 |
| Plasticizer (ethylene glycol) | 8 |
| Colloidal sulfur | 0. 4 |
| "Nokusera-TP" | 0. 4 |
| Active zinc flower | 0. 8 |

These substances were mixed together and further processed as before. The results were similar as before. Tensile strength: 105 kgs./cm.$^2$; elongation: 570 percent.

Example 10

|  | Parts |
|---|---|
| Methyl cellulose (degree of methylation: 9.6 mol percent) | 70 |
| Natural rubber latex | 30 |
| Plasticizer (glycerine) | 12 |
| Colloidal sulfur | 1 |
| "Nokusera-MZ" | 1 |
| Active zinc flower | 2 |

These substances were mixed together and processed further as before. The thus-fabricated condoms represented superior performances as before. The tensile strength: 240 kgs./cm.$^2$; elongation: 380 percent.

Example 11

The production liquor of example 1 was prepared and several condoms were manufactured, each having a film thickness of 0.04 mm.

These condoms on the respective forms were again treated by dipping in a bath containing:

natural rubber latex — 100 parts
 colloidal sulfur — 1 part
 "SOKCINOL-TP" — 1 part
 active zinc flower — 2 parts prepared in an aqueous 10 percent dispersion.

Upon being dipped, once each of the condoms was covered with a thin rubber film, 0.005 mm. thick. After being heated for vulcanization at 100° C. for 90 minutes, these double-layer condoms were separated from the respective forms. It was found that the elasticity of the condom was higher by about 30 percent than that of the corresponding single layer product.

Example 12

The double-layer product prepared in example 11 was covered further on the inner wall surface with a thin rubber film, 0.005 mm. thick. The coating procedure was substantially the same as in the foregoing example 11, except that the condom was dipped after being turned over on the form.

The resulting elasticity of the triple-layer product was increased by about 20 percent over that of the double-layer one.

Example 13

In place of the latex bath liquid, an aqueous dispersion of the following composition was prepared.

|  | Parts |
|---|---|
| Polyvinul alcohol (saponification value: 78.3 mol percent; degree of polymerization: 14,000) | 35 |
| S.B.R | 65 |
| Colloidal sulfur | 0. 7 |
| "Nokusera-NZ" | 0. 7 |
| Active zinc flower | 1. 4 |

These substances were mixed together and added with water so as to prepare a 10 percent dispersion. With this dispersion, the condoms prepared in example 1 were coated with a second layer, 0.008 mm. thick. The results were substantially same as those obtained in example 11.

Example 14

Glass forms were dipped three times in a manufacturing bath referred to in the foregoing example 5 and dried, the resulting condoms having each a film thickness of 0.04 mm.

Next, an aqueous dispersion, containing:
  natural rubber latex — 100 parts
  colloidal sulfur — 1 part
  "SOKCINAL-TP" — 1 part
  active zinc flower — 2 parts was prepared, in which the above-prepared condoms were dipped, so as to form a natural rubber film, 0.01 mm. thick, on each of the condoms. These double-layer condoms were heated at 100° C. for 90 minutes for vulcanization, and separated from the respective forms. The results were substantially same as was referred to in the foregoing example 11.

Example 15

In the process mentioned in example 14, the glass forms were dipped once in the second coating bath and then three times in the first bath and finally cured as before for vulcanizing. Each of the products comprises an inside natural rubber layer, 0.006 mm. thick, and an outer, water-dispersible layer of mixed resinous substances, 0.04 mm. thick.

Preferred embodiments of this invention have been described in the foregoing specification, but it is specifically contemplated that modifications thereof and additions thereto will be obvious to those skilled in the art and such modifications and additions are specifically contemplated to be a part of this invention, the scope of which is limited only as defined in the appended claims.

We claim:

1. A condom formed of a composition capable of maintaining a continuous film shape in contact with aqueous liquid kept at human body temperature or higher and also capable of being decomposed upon contact with cold water, said composition comprising mixture of rubber and a synthetic resinous substance selected from the group consisting of a polyvinyl alcohol, a saponified copolymer of a vinyl ester with an acid or a monomer copolymerizable therewith, a resinous polyvinyl alkylether and a cellulose.

2. A condom as set forth in claim 1, wherein the blending ratio for said synthetic resinous substance with said rubber is from 8:2 to 5:5.

3. A condom as set forth in claim 1, wherein the saponification value and polymerization degree of said polyvinyl alcohol or said saponified copolymer of vinyl ester are 60—80 mol. percent and 500—2,000 respectively.

4. A condom as set forth in claim 1, wherein said vinyl ester is vinyl acetate.

5. A condom as set forth in claim 1, wherein said acid or monomer copolymerizable with said saponified copolymer of vinyl ester is a member selected from the group consisting of acrylic acid, acrylic amide, vinyl chloride, crotonic acid, maleic acid, and anhydrous maleic acid.

6. A condom as set forth in claim 1, wherein said polyvinyl alcohol resin is partially acetalized or urethanized.

7. A condom as set forth in claim 6, wherein said partially acetalized polyvinyl alcohol is a member selected from the group consisting of formalized-, acetoacetalized-, propionalized-, butyralized-, methoxybutyralized-, ethoxybutyralized-, and benzalized-polyvinyl alcohol.

8. A condom as set forth in claim 1, wherein said resinous polyvinyl alkylether is polyvinyl methylether or a copolymer thereof.

9. A condom as set forth in claim 1, wherein said cellulose derivative is a member selected from the group consisting of methyl cellulose, ethyl cellulose, carboxymethyl cellulose and carboxyethyl cellulose.

10. A condom as set forth in claim 1, wherein said rubber substance is a member selected from the group comprising styrene-butadiene rubber, acryronitrile-butadiene rubber, butadiene rubber, chloroprene rubber and acrylate-butadiene rubber.